US009462302B2

(12) United States Patent
Odlund et al.

(10) Patent No.: US 9,462,302 B2
(45) Date of Patent: Oct. 4, 2016

(54) EFFICIENT DELINEATION AND DISTRIBUTION OF MEDIA SEGMENTS

(75) Inventors: Anders Odlund, San Francisco, CA (US); Cedric Fernandes, San Ramon, CA (US)

(73) Assignee: MobiTV, Inc., Emeryville, CA (US)

( * ) Notice: Subject to any disclaimer, the term of this patent is extended or adjusted under 35 U.S.C. 154(b) by 364 days.

(21) Appl. No.: 13/403,552

(22) Filed: Feb. 23, 2012

(65) Prior Publication Data

US 2013/0227074 A1     Aug. 29, 2013

(51) Int. Cl.
| | | |
|---|---|---|
| G06F 15/16 | (2006.01) |
| H04N 21/2183 | (2011.01) |
| H04N 21/658 | (2011.01) |
| H04N 21/8352 | (2011.01) |
| H04N 21/845 | (2011.01) |

(52) U.S. Cl.
CPC ...... *H04N 21/2183* (2013.01); *H04N 21/6581* (2013.01); *H04N 21/8352* (2013.01); *H04N 21/8456* (2013.01)

(58) Field of Classification Search
CPC ............. H04N 21/2183; H04N 21/8456; H04N 21/8352; H04N 21/6581; H04N 21/23424; H04N 21/812; H04N 21/25891; H04N 21/6587; H04N 21/4325; H04N 21/4331; H04N 19/164; H04N 19/162; H04N 19/172; H04L 65/4084; H04L 65/409; H04L 65/602; H04L 65/607
USPC ............... 709/219, 231; 707/702; 386/241
See application file for complete search history.

(56) References Cited

U.S. PATENT DOCUMENTS

| | | | | |
|---|---|---|---|---|
| 8,108,893 B2* | 1/2012 | Haberman | ......... | G06Q 30/0251 705/14.49 |
| 8,239,445 B1* | 8/2012 | Gage | ....................... | H04L 29/06 709/203 |
| 2001/0033296 A1* | 10/2001 | Fullerton | .......... | G06F 17/30017 715/730 |
| 2001/0041053 A1* | 11/2001 | Abecassis | ............... | A63F 13/10 386/291 |
| 2002/0068525 A1* | 6/2002 | Brown et al. | ................ | 455/3.01 |
| 2002/0135608 A1* | 9/2002 | Hamada | ............... | G11B 27/105 715/723 |

(Continued)

FOREIGN PATENT DOCUMENTS

WO    2013126320 A2    8/2013

OTHER PUBLICATIONS

"International Application No. PCT/US2013/026638, International Search Report and Written Opinion mailed Apr. 23, 2013", 8 pgs.

*Primary Examiner* — Alina N Boutah
(74) *Attorney, Agent, or Firm* — Kwan & Olynick LLP

(57) ABSTRACT

Media such as live media streams can be efficiently delineated and distributed to a variety of devices using a number of different mechanisms. A particular media sequence can be identified by a device user to allow a content server or fragment server to generate a media segment that can be shared or distributed using mechanisms such as social networks. A device user may provide marker indicators, time frames, event triggers, etc., that indicate to a content server where a media segment can be delineated. A link to the media segment may be provided along with pre-roll and post-roll targeted or content-specific advertising to a variety of other users.

18 Claims, 7 Drawing Sheets

(56) References Cited

U.S. PATENT DOCUMENTS

| | | | |
|---|---|---|---|
| 2006/0041902 A1* | 2/2006 | Zigmond | H04H 60/31 725/9 |
| 2007/0198532 A1* | 8/2007 | Krikorian | G06Q 30/0273 705/14.69 |
| 2009/0006191 A1 | 1/2009 | Arankalle et al. | |
| 2009/0136216 A1* | 5/2009 | Soroushian | H04N 21/4325 386/248 |
| 2009/0150406 A1* | 6/2009 | Giblin | G06Q 40/12 |
| 2011/0126236 A1 | 5/2011 | Arrasvuori et al. | |
| 2012/0144437 A1* | 6/2012 | Beals | 725/92 |
| 2012/0166289 A1* | 6/2012 | Gadoury et al. | 705/14.66 |
| 2012/0197419 A1* | 8/2012 | Dhruv | H04N 21/6543 700/94 |
| 2013/0044801 A1* | 2/2013 | Cote et al. | H04N 19/146 375/240.01 |
| 2013/0290845 A1* | 10/2013 | Rudman et al. | 715/716 |

* cited by examiner

EFFICIENT DELINEATION AND DISTRIBUTION OF MEDIA SEGMENTS

TECHNICAL FIELD

The present disclosure relates to efficient delineation and distribution of media segments.

DESCRIPTION OF RELATED ART

Media may be distributed over a variety of networks to a number of different devices. A user may elect to view and share using different mechanisms. In some instances, a link to a video that a user watches can be distributed to other users on a social network. In other instances, a video file may be distributed by email or posted on a forum.

However, mechanisms for sharing media content are limited. Consequently, it is desirable to provide improved mechanisms for delineating and distributing media segments.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
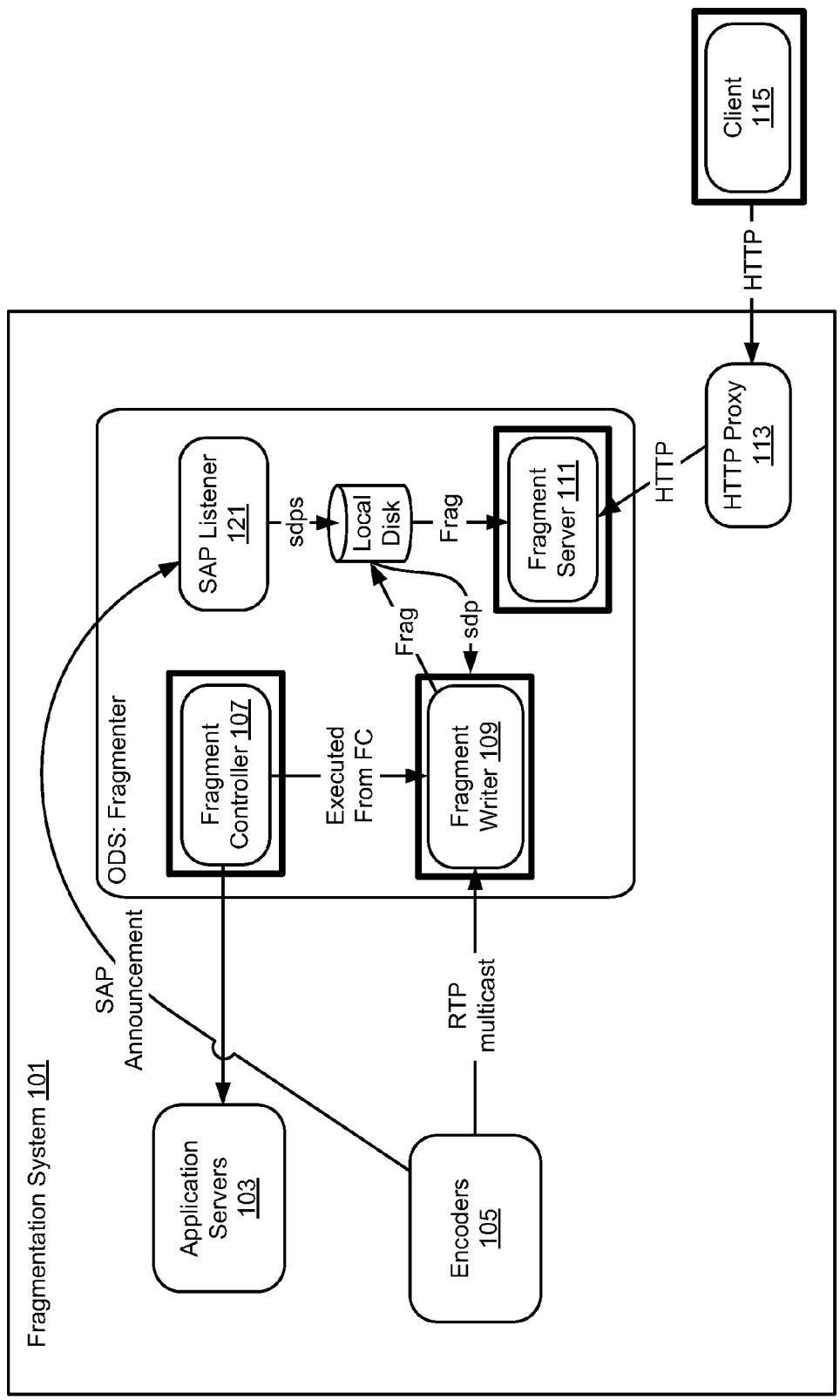
FIG. 1 illustrates one example of a media delivery system.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Media such as live media streams can be efficiently delineated and distributed to a variety of devices using a number of different mechanisms. A particular media sequence can be identified by a device user to allow a content server or fragment server to generate a media segment that can be shared or distributed using mechanisms such as social networks. A device user may provide marker indicators, time frames, event triggers, etc., that indicate to a content server where a media segment can be delineated. A link to the media segment may be provided along with pre-roll and post-roll targeted or content-specific advertising to a variety of other users.

Example Embodiments

Mechanisms for sharing media are limited. In some instances, a user may share a particular video by downloading and/or uploading the clip to particular sites. Links can be used to direct users to particular videos. Media files may be posted on social networking sites, forums, or blogs. Email may be used to send still other files. However, mechanisms for sharing video can be inefficient.

According to various embodiments, a user may be authorized to receive a media stream. In particular embodiments, the user may be authorized to receive the particular media stream at particular quality levels for particular devices. In many instances, a user may not be allowed to easily download or copy a media stream to local storage. Similarly, the user may not be allowed for licensing reasons to easily capture the media stream for distribution. In many instances, others may not be authorized to view the media stream or a time period designated for showing the live stream may have already passed. Nonetheless, it may be desirable to allow a user some ability to share at least a portion of the media stream at the same or different quality. For example, it may be desirable to allow a user to share a short, several minute clip of a video. The user may wish to share it on a social networking site or post a link on a biog.

Consequently, techniques of the present invention allow for sharing of time delineated video segments. A user viewing media such as a live media stream can identify start and endpoints and/or clip durations, markers, or events for sharing video segments. A snapshot server, such as a content server or fragment server, obtains the video segment and may save it in a self-contained file. In some instances, the snapshot server requests the same channel the user was playing from time t−n to t+m where n and m are user defined times. According to various embodiments, the snapshot server obtains the video segment for a live video stream from channel buffers or cache at the server. The generated file may be posted as a file itself or as a link to the file.

According to various embodiments, pre-roll and post-roll advertising is generated for the video segment. In particular embodiments, pre-roll and post-roll advertising is generated based on the content of the video segment, tags associated with the video segment, or metadata such as closed captioning information associated with the video segment. Video clips can be efficiently shared using social media including blogs, forums, and social networks. The user need not worry about recording content on a device or storing content.

In particular embodiments, a video segment is watermarked with copyright information, a user identifier, and/or a content provider identifier, etc., prior to any distribution on a social network, forum, blog, etc. A user can instantly share a short video segment of what they have just viewed, or what they are currently watching. In some instances, video segments may be tagged for easy sharing. The user may elect to share a segment containing a conversation, speech, car chase, fight sequence, etc. Alternatively, the user may select start and end points based on time. In still other instances, the user may select pre-delineated sequences that are likely to be shared. Any marker, tag, or indicators provided to a snapshot server such as a content server or fragment server to identify a media segment for delineation is referred to herein as a segment indicator.

According to various embodiments, a snapshot server is a network digital video recorder component associate with a content server that receives these segment indicators and generates individual media files corresponding to these segment indicators. These media files may be standard media files playable on any device. The files can then be shared directly by the users or links to the files may be provided for sharing.

According to various embodiments, pre-roll and/or post-roll advertising for the media segment is selected based on segment indicators, metadata, and/or tags. In some examples, pre-roll and/or post-roll targeted advertising is selected based on metadata such as comments or closed captioning information associated with the media segment. According to various embodiments, the segment can be watermarked using a user identifier and/or content provider identifier to allow for monitoring of distribution.

A variety of mechanisms are used to deliver media streams to devices. In particular embodiments, a server computer receives a connection for a media stream, establishes a session, and provides a media stream to a client device. The media stream includes packets encapsulating frames such as MPEG-4 frames. The MPEG-4 frames themselves may be key frames or differential frames. The specific encapsulation methodology used by the server depends on the type of content, the format of that content, the format of the payload, and the application and transmission protocols being used to send the data. After the client device receives the media stream, the client device decapsulates the packets to obtain the MPEG frames and decodes the MPEG frames to obtain the actual media data.

Conventional MPEG-4 files require that a player parse the entire header before any of the data can be decoded. Parsing the entire header can take a notable amount of time, particularly on devices with limited network and processing resources. Consequently, the techniques and mechanisms of the present invention provide a fragmented MPEG-4 framework that allows playback upon receiving a first MPEG-4 file fragment. A second MPEG-4 file fragment can be requested using information included in the first MPEG-4 file fragment. According to various embodiments, the second MPEG-4 file fragment requested may be a fragment corresponding to a higher or lower bit-rate stream than the stream associated with the first file fragment.

MPEG-4 is an extensible container format that does not have a fixed structure for describing media types. Instead, MPEG-4 has an object hierarchy that allows custom structures to be defined for each format. The format description is stored in the sample description ('stsd') box for each stream. The sample description box may include information that may not be known until all data has been encoded. For example, the sample description box may include an average bit rate that is not known prior to encoding.

According to various embodiments, MPEG-4 files are fragmented so that a live stream can be recorded and played back in a close to live manner. MPEG-4 files can be created without having to wait until all content is written to prepare the movie headers. To allow for MPEG-4 fragmentation without out-of-band signaling, a box structure is provided to include synchronization information, end of file information, and chapter information. According to various embodiments, synchronization information is used to synchronize audio and video when playback entails starting in the middle of a stream. End of file information signals when the current program or file is over. This may include information to continue streaming the next program or file. Chapter information may be used for video on demand content that is broken up into chapters, possibly separated by advertisement slots.

TCP is more widely used than UDP and networking technologies including switch, load balancer, and network card technologies are more developed for TCP than for UDP. Consequently, techniques and mechanisms are provided for delivering fragmented live media over TCP. Sequence information is also maintained and/or modified to allow seamless client device operation. Timing and sequence information in a media stream is preserved.

Requests are exposed as separate files to clients and files should playback on players that handle fragmented MPEG-4. Live or near live, video on demand (VOD), and digital video record (DYR) content can all be handled using fragmentation.

According to various embodiments, playback stoppage is detected at a content server or fragmentation server. In some examples, a device sends a playback stoppage request. In other examples, a content server detects that a subsequent fragment request has not been received. The content server maintains user information and media stream position information. In some examples, the content server also maintains device information and quality or bit rate data. When a request for a fragment or a resume request is received from the same device, or from a different device associated with the same user, the content server identifies bit rate and the media stream along with the appropriate fragment to send to the user. The fragment may correspond to media data transmitted in the past as a live feed and may no longer be live, but the user is able to continue viewing the media stream in a seamless manner at a resolution appropriate for a current viewing device.

The request from the device may include a bit rate and resolution, or a content server may identify an appropriate bit rate and resolution using device information. A resume request along with a desired bit rate may also be received from a different device associated with a user. Fragments maintained at a content server may be used to respond to requests from numerous users on a variety of devices requesting playback of media streams at different points in time and at different quality levels. According to various embodiments, fragments can be maintained once at different quality levels and cached efficiently even though a variety of disparate requests for the same or different media streams will be received. Delineated segments may also be maintained as fragments at particular quality levels or media files at particular quality levels.

FIG. 1 is a diagrammatic representation illustrating one example of a fragmentation system 101 associated with a content server that can use the techniques and mechanisms of the present invention. Encoders 105 receive media data from satellite, content libraries, and other content sources and sends RTP multicast data to fragment writer 109. The encoders 105 also send session announcement protocol (SAP) announcements to SAP listener 121. According to various embodiments, the fragment writer 109 creates fragments for live streaming, and writes files to disk for recording. The fragment writer 109 receives RTP multicast streams from the encoders 105 and parses the streams to repackage the audio/video data as part of fragmented MPEG-4 files. When a new program starts, the fragment writer 109 creates a new MPEG-4 file on fragment storage and appends fragments. In particular embodiments, the fragment writer 109 supports live and/or DVR configurations.

The fragment server 111 provides the caching layer with fragments for clients. The design philosophy behind the client/server application programming interface (API) minimizes round trips and reduces complexity as much as possible when it comes to delivery of the media data to the client 115. The fragment server 111 provides live streams and/or DVR configurations.

The fragment controller 107 is connected to application servers 103 and controls the fragmentation of live channel streams. The fragmentation controller 107 optionally integrates guide data to drive the recordings for a global/network DVR. In particular embodiments, the fragment controller 107 embeds logic around the recording to simplify the fragment writer 109 component. According to various embodiments, the fragment controller 107 will run on the same host as the fragment writer 109. In particular embodiments, the fragment controller 107 instantiates instances of the fragment writer 109 and manages high availability.

According to various embodiments, the client 115 uses a media component that requests fragmented MPEG-4 files, allows trick-play, and manages bandwidth adaptation. The client communicates with the application services associated with HTTP proxy 113 to get guides and present the user with the recorded content available.

Figure 2:
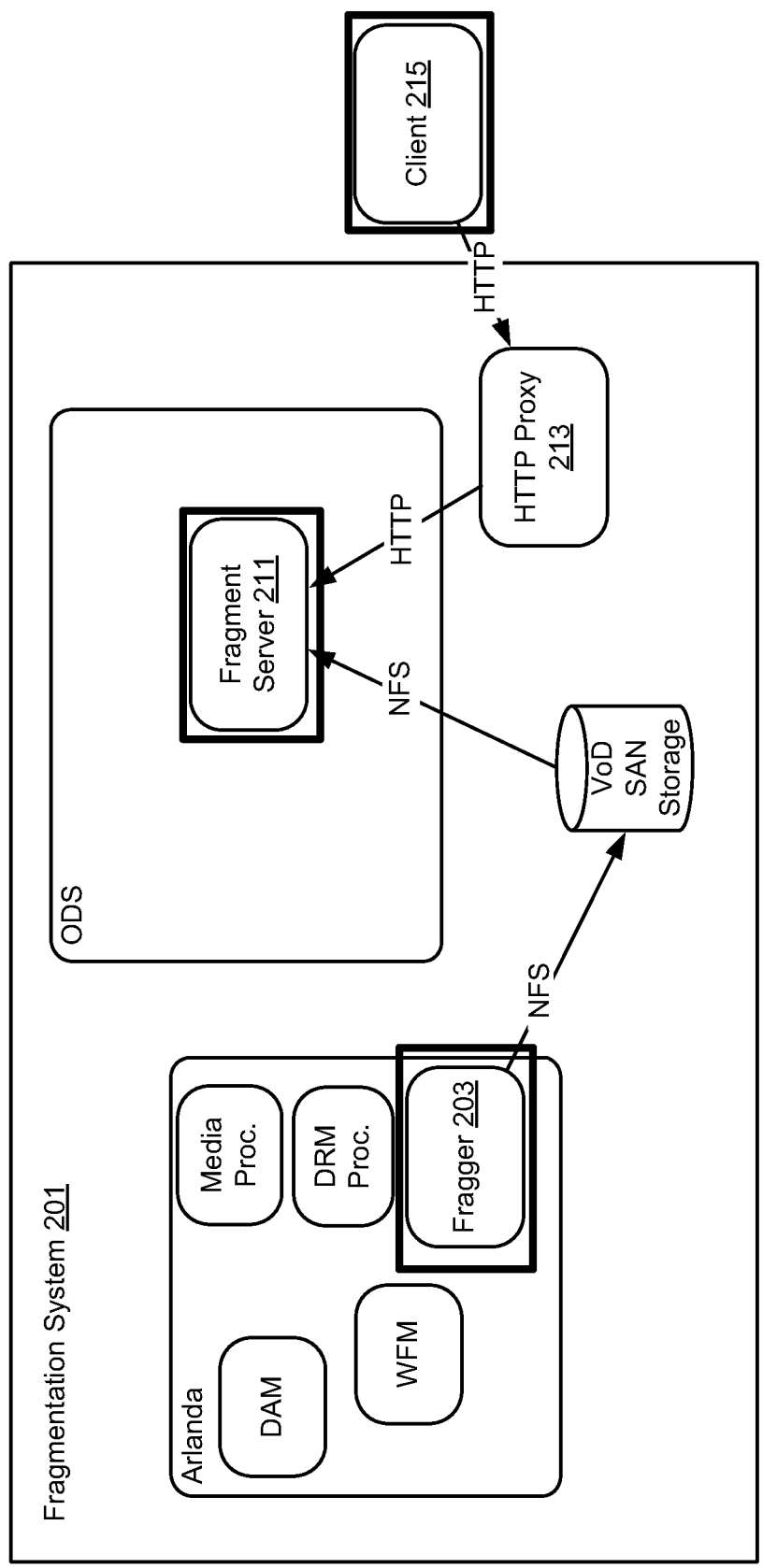
FIG. 2 illustrates another example of a media delivery system.

FIG. 2 illustrates one example of a fragmentation system 201 that can be used for video-on-demand (VoD) content. Fragger 203 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 211 provides the caching layer with fragments for clients. The design philosophy behind the client/server API minimizes round trips and reduces complexity as much as possible when it comes to delivery of the media data to the client 215. The fragment server 211 provides VoD content.

According to various embodiments, the client 215 uses a media component that requests fragmented MPEG-4 files, allows trick-play, and manages bandwidth adaptation. The client communicates with the application services associated with HTTP proxy 213 to get guides and present the user with the recorded content available.

Figure 3:
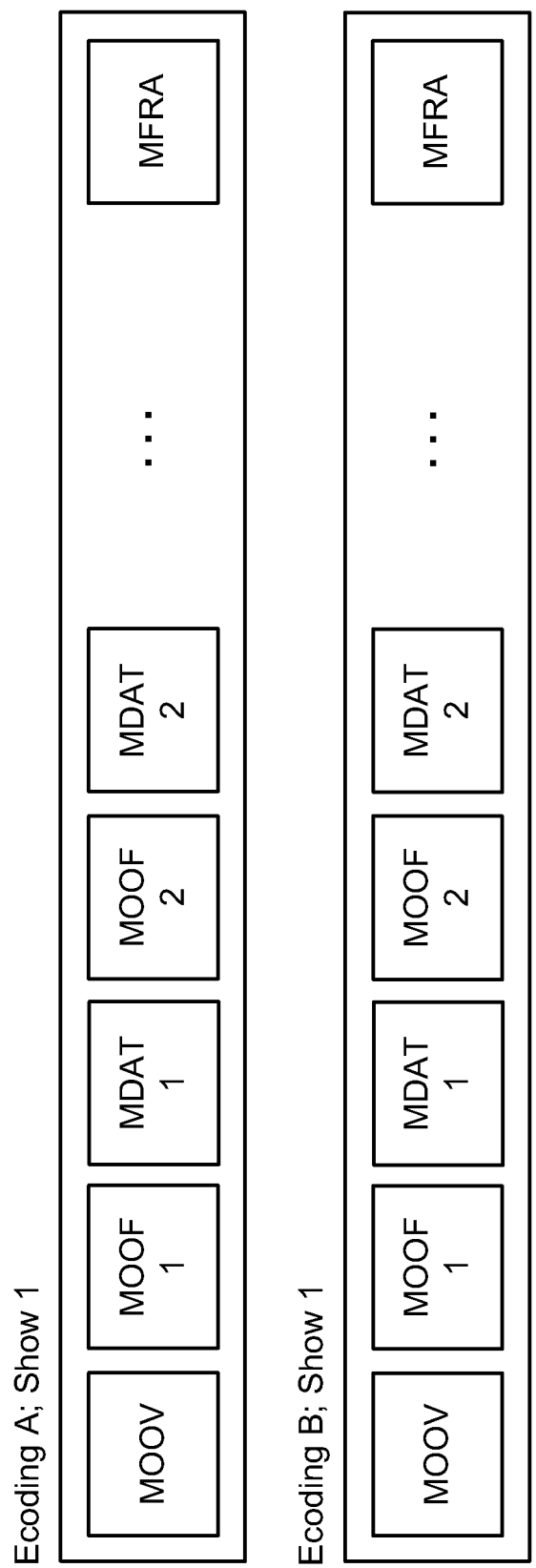
FIG. 3 illustrates examples of encoding streams.

FIG. 3 illustrates examples of files stored by the fragment writer. According to various embodiments, the fragment writer is a component in the overall fragmenter. It is a binary that uses command line arguments to record a particular program based on either NTP time from the encoded stream or wallclock time. In particular embodiments, this is configurable as part of the arguments and depends on the input stream. When the fragment writer completes recording a program, it exits. For live streams, programs are artificially created to be short time intervals e.g. 5-15 minutes in length.

According to various embodiments, the fragment writer command line arguments are the SDP file of the channel to record, the start time, end time, name of the current and next output files. The fragment writer listens to RTP traffic from the live video encoders and rewrites the media data to disk as fragmented MPEG-4. According to various embodiments, media data is written as fragmented MPEG-4 as defined in MPEG-4 part 12 (ISO/IEC 14496-12). Each broadcast show is written to disk as a separate file indicated by the show ID (derived from EPG). Clients include the show ID as part of the channel name when requesting to view a prerecorded show. The fragment writer consumes each of the different encodings and stores them as a different MPEG-4 fragment.

In particular embodiments, the fragment writer writes the RTP data for a particular encoding and the show ID field to a single file. Inside that file, there is metadata information that describes the entire file (MOOV blocks). Atoms are stored as groups of MOOF/MDAT pairs to allow a show to be saved as a single file. At the end of the file there is random access information that can be used to enable a client to perform bandwidth adaptation and trick play functionality.

According to various embodiments, the fragment writer includes an option which encrypts fragments to ensure stream security during the recording process. The fragment writer will request an encoding key from the license manager. The keys used are similar to that done for DRM. The encoding format is slightly different where MOOF is encoded. The encryption occurs once so that it does not create prohibitive costs during delivery to clients.

The fragment server responds to HTTP requests for content. According to various embodiments, it provides APIs that can be used by clients to get necessary headers required to decode the video and seek any desired time frame within the fragment and APIs to watch channels live. Effectively, live channels are served from the most recently written fragments for the show on that channel. The fragment server returns the media header (necessary for initializing decoders), particular fragments, and the random access block to clients. According to various embodiments, the APIs supported allow for optimization where the metadata header information is returned to the client along with the first fragment. The fragment writer creates a series of fragments within the file. When a client requests a stream, it makes requests for each of these fragments and the fragment server reads the portion of the file pertaining to that fragment and returns it to the client.

According to various embodiments, the fragment server uses a REST API that is cache-friendly so that most requests made to the fragment server can be cached. The fragment server uses cache control headers and ETag headers to provide the proper hints to caches. This API also provides the ability to understand where a particular user stopped playing and to start play from that point (providing the capability for pause on one device and resume on another).

In particular embodiments, client requests for fragments follow the following format: http://{HOSTNAME}/frag/{CHANNEL}/{BITRATE}/[{ID}/]{COMMAND}[/{ARG}] e.g. http://frag.hosttv.com/frag/1/H8QVGAH264/1270059632.mp4/fragment/42. According to various embodiments, the channel name will be the same as the backend-channel name that is used as the channel portion of the SDP file. VoD uses a channel name of "vod". The BITRATE should follow the BITRATE/RESOLUTION identifier scheme used for RTP streams. The ID is dynamically assigned. For live streams, this may be the UNIX timestamp; for DVR this will be a unique ID for the show; for VoD this will be the asset ID. The ID is optional and not included in LIVE command requests. The command and argument are used to indicate the exact command desired and any arguments. For example, to request chunk 42, this portion would be "fragment/42".

The tin format makes the requests content delivery network (CDN) friendly because the fragments will never change after this point so two separate clients watching the same stream can be serviced using a cache. In particular, the head end architecture leverages this to avoid too many dynamic requests arriving at the Fragment Server by using an HTTP proxy at the head end to cache requests.

According to various embodiments, the fragment controller is a daemon that runs on the fragmenter and manages the fragment writer processes. A configured filter that is executed by the fragment controller can be used to generate the list of broadcasts to be recorded. This filter integrates with external components such as a guide server to determine which shows to record and which broadcast ID to use.

According to various embodiments, the client includes an application logic component and a media rendering component. The application logic component presents the user interface (UI) for the user, communicates to the front-end server to get shows that are available for the user, and authenticates the content. As part of this process, the server returns URLs to media assets that are passed to the media rendering component.

In particular embodiments, the client relies on the fact that each fragment in a fragmented MP4 file has a sequence number. Using this knowledge and a well-defined URL structure for communicating with the server, the client requests fragments individually as if it was reading separate files from the server simply by requesting URLs for files associated with increasing sequence numbers. In some embodiments, the client can request files corresponding to higher or lower bit rate streams depending on device and network resources.

Since each file contains the information needed to create the URL for the next file, no special playlist files are needed, and all actions (startup, channel change, seeking) can be performed with a single HTTP request. After each fragment is downloaded, the client assesses, among other things, the size of the fragment and the time needed to download it in order to determine if downshifting is needed or if there is enough bandwidth available to request a higher bit rate.

Because each request to the server looks like a request to a separate file, the response to requests can be cached in any HTTP Proxy, or be distributed over any HTTP based content delivery network CDN.

Figure 4:
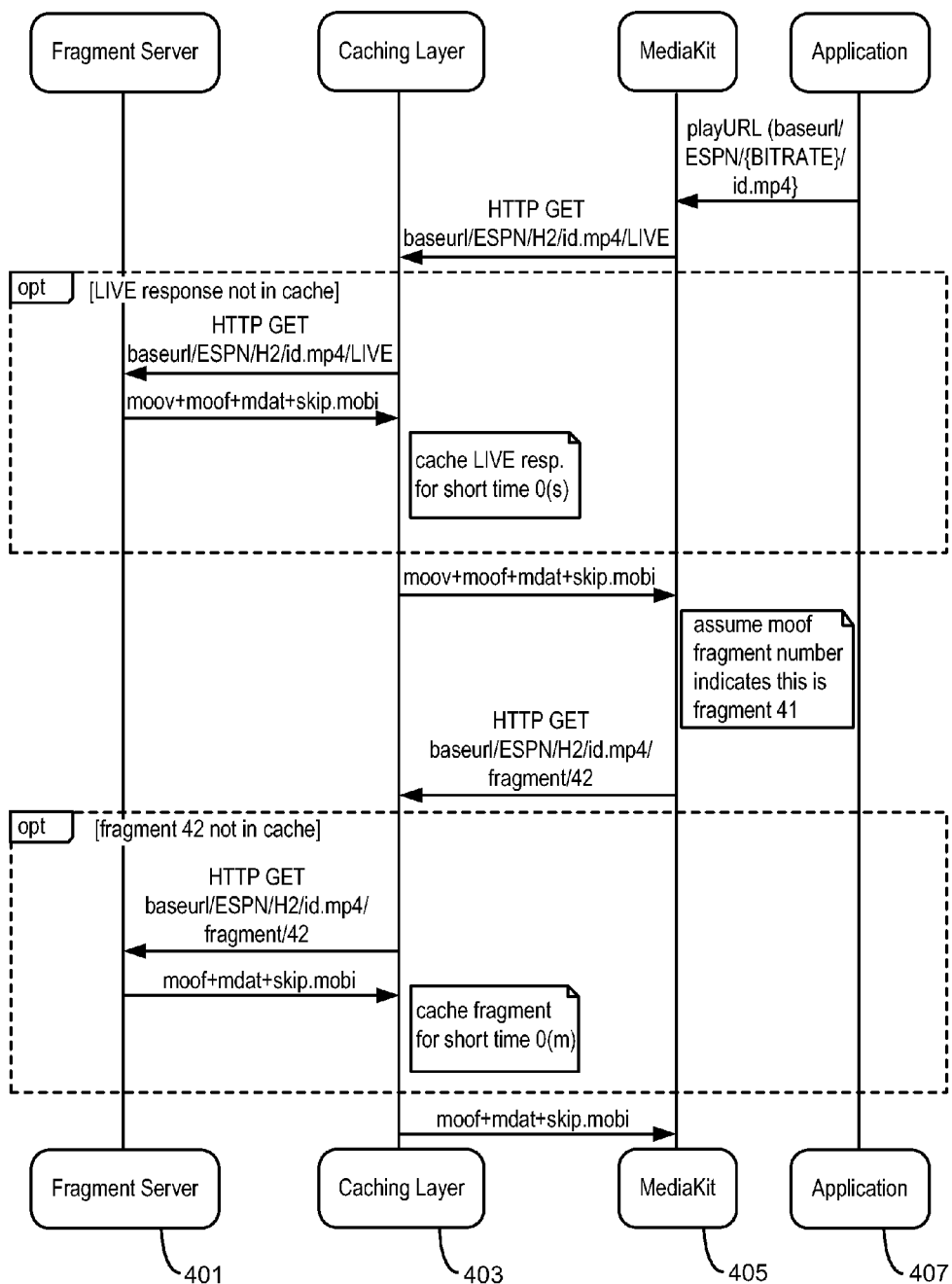
FIG. 4 illustrates one example of an exchange used with a media delivery system.

FIG. 4 illustrates an interaction for a client receiving a media stream such as a live stream. The client starts playback when fragment 41 plays out from the server. The client uses the fragment number so that it can request the appropriate subsequent file fragment. An application such as a player application 407 sends a request to mediakit 405. The request may include a base address and bit rate. The mediakit 405 sends an HTTP get request to caching layer 403. According to various embodiments, the live response is not in cache, and the caching layer 403 forwards the HTTP get request to a fragment server 401. The fragment server 401 performs processing and sends the appropriate fragment to the caching layer 403 which forwards to the data to mediakit 405.

The fragment may be cached for a short period of time at caching layer 403. The mediakit 405 identifies the fragment number and determines whether resources are sufficient to play the fragment. In some examples, resources such as processing or bandwidth resources are insufficient. The fragment may not have been received quickly enough, or the device may be having trouble decoding the fragment with sufficient speed. Consequently, the mediakit 405 may request a next fragment having a different data rate. In some instances, the mediakit 405 may request a next fragment having a higher data rate. According to various embodiments, the fragment server 401 maintains fragments for different quality of service streams with timing synchronization information to allow for timing accurate playback.

The mediakit 405 requests a next fragment using information from the received fragment. According to various embodiments, the next fragment for the media stream may be maintained on a different server, may have a different bit rate, or may require different authorization. Caching layer 403 determines that the next fragment is not in cache and forwards the request to fragment server 401. The fragment server 401 sends the fragment to caching layer 403 and the fragment is cached for a short period of time. The fragment is then sent to mediakit 405.

Figure 5:
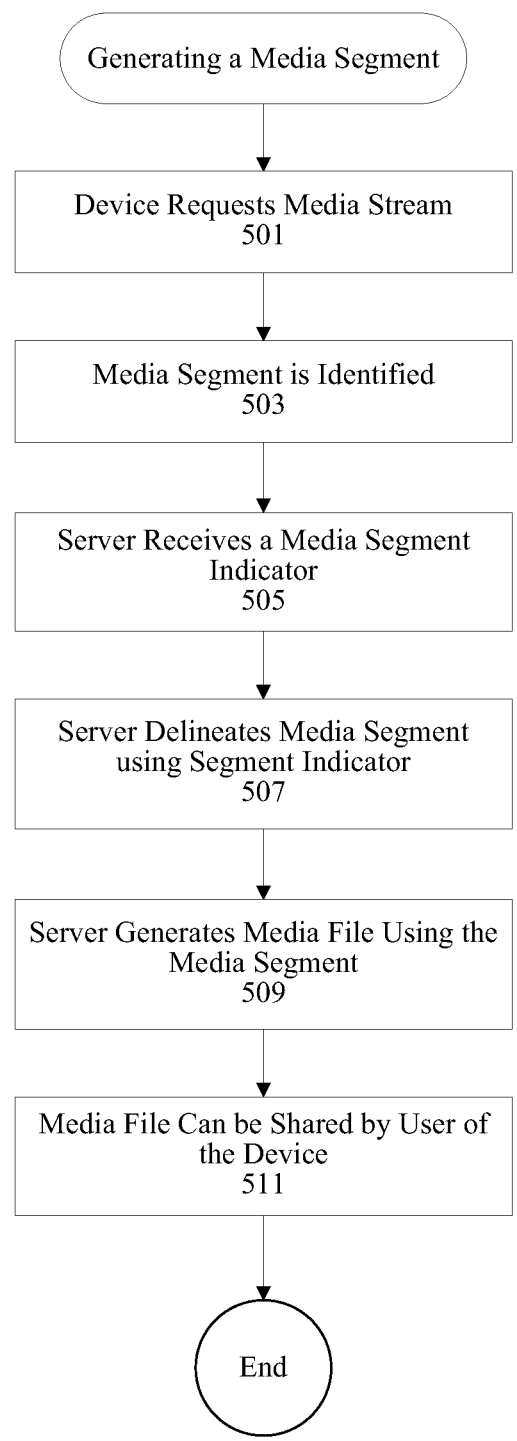
FIG. 5 illustrates one technique for generating a media segment.

FIG. 5 illustrates a particular example of a technique for generating a media segment. According to various embodiments, a media stream is requested by a device at 501. The media stream may be a live stream, media clip, media file, etc. The request for the media stream may be an HTTP GET request with a baseurl, bit rate, and file name. At 503, the media segment is identified. According to various embodiments, the media segment may be a 35 second sequence from an hour long live media stream. The media segment may be identified using time indicators such as a start time and end time indicator. Alternatively, certain sequences may include tags such as fight scene, car chase, love scene, monologue, etc., that the user may select in order to identify a media segment. In still other examples, the media stream may include markers that the user can select. At 505, a server receives a media segment indicator such as one or more time indicators, tags, or markers. In particular embodiments, the server is a snapshot server, content server, and/or fragment server. According to various embodiments, the server delineates the media segment maintained in cache using the segment indicator at 507. The media stream may only be available in a channel buffer. At 509, the server generates a media file using the media segment maintained in cache. The media file can then be shared by a user of the device at 511. In some examples, the media file itself is shared while in other examples, a link to the media file is shared.

Figure 6:
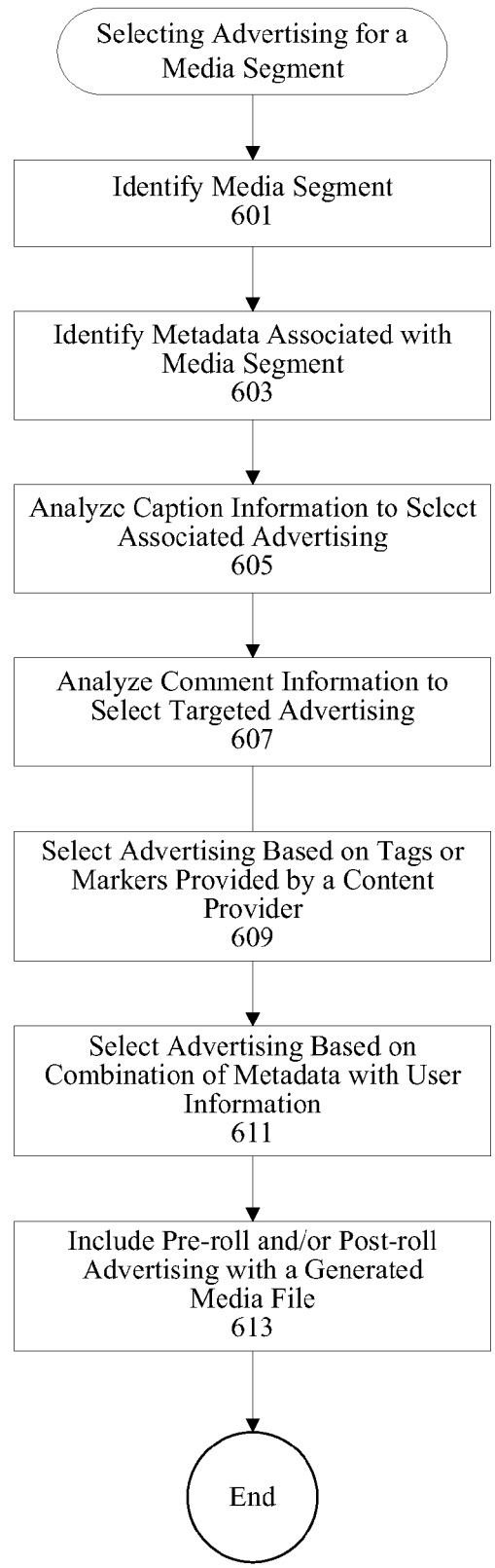
FIG. 6 illustrates one technique for selecting advertising for the media segment.

FIG. 6 illustrates a particular example of a technique for selecting advertising for a media segment. According to various embodiments, a media segment is identified at 601. In particular embodiments, metadata associated with the media segment is identified at 603. Metadata may include closed caption information, comment information, tags, etc. According to various embodiments, caption information is analyzed to select advertising associated with the caption information at 605. Comment information provided by a user or other users may be analyzed to select targeted advertising at 607. Tags included by a content provider or markers labeling particular sequences or types of media may also be used to select advertising at 609. In particular embodiments, user profile information or preference information may be combined with metadata to select advertising at 611. At 613, pre-roll and/or post-roll advertising is included with a generated media file.

Figure 7:
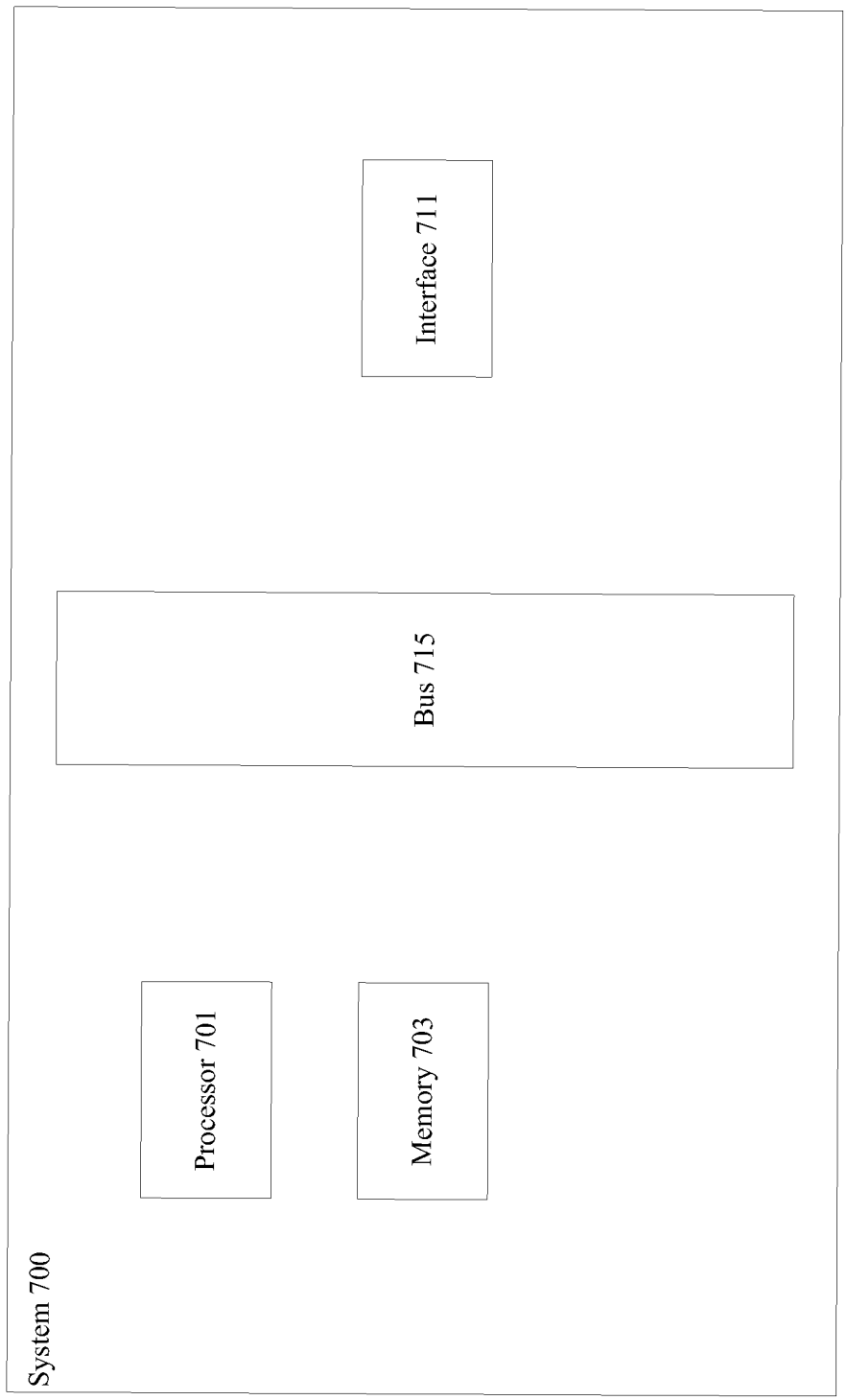
FIG. 7 illustrates one example of a system.

FIG. 7 illustrates one example of a server. According to particular embodiments, a system 700 suitable for implementing particular embodiments of the present invention includes a processor 701, a memory 703, an interface 711, and a bus 715 (e.g., a PCI bus or other interconnection fabric) and operates as a streaming server. When acting under the control of appropriate software or firmware, the processor 701 is responsible for modifying and transmitting live media data to a client. Various specially configured devices can also be used in place of a processor 701 or in addition to processor 701. The interface 711 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 700 is a fragment server that also includes a transceiver, streaming buffers, and a program guide database. The fragment server may also be associated with subscription management, logging and report generation, and monitoring capabilities. In particular embodiments, the fragment server can be associated with functionality for allowing operation with mobile devices such as cellular phones operating in a particular cellular network and providing subscription management capabilities. According to various embodiments, an authentication module verifies the identity of devices including mobile devices. A logging and report generation module tracks mobile device requests and associated responses. A monitor system allows an administrator to view usage patterns and system availability. According to various embodiments, the fragment server 791 handles requests and responses for media content related transactions while a separate streaming server provides the actual media streams.

Although a particular fragment server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method, comprising:
receiving a request for a media stream from a device, wherein the request is received at a server;
transmitting the media stream to the device;
receiving a media segment indicator and a plurality of event triggers from the device, the media segment indicator and the plurality of event triggers identifying a media segment included in the media stream, wherein the media segment is shorter than the media stream in length; and
generating a media segment file at the server by delineating the media segment from a portion of the media stream and subsequently obtaining the media segment from the media stream maintained in cache at the server, and saving the media segment in a self-contained file, wherein the media segment file is shared by a user of the device over a network, and wherein pre-roll advertising is selected for the media segment file.

2. The method of claim 1, wherein pre-roll advertising is selected using metadata corresponding to the media segment.

3. The method of claim 2, wherein metadata comprises closed caption information.

4. The method of claim 1, wherein post-roll advertising is selected for the media segment file.

5. The method of claim 4, wherein post-roll advertising is selected using metadata corresponding to the media segment.

6. The method of claim 5, wherein metadata comprises closed caption information.

7. The method of claim 1, wherein the segment indicator comprises a tag or marker.

8. The method of claim 1, wherein the segment indicator comprises a start time indicator.

9. The method of claim 1, wherein the segment indicator comprises an end time indicator.

10. The method of claim 1, wherein the server is a snapshot server.

11. The method of claim 1, wherein the server is a fragment server.

12. The method of claim 1, wherein the media stream is selected using device characteristics and subscription level.

13. A system, comprising:
an interface operable to receive a request for a media stream from a device and transmit the media stream to the device, wherein the interface is further operable to receive a media segment indicator and a plurality of event triggers from the device, the media segment indicator and the plurality of event triggers identifying a media segment included in the media stream, wherein the media segment is shorter than the media stream in length; and
a hardware processor operable to generate a media segment file at a server by delineating the media segment from a portion of the media stream and subsequently obtaining the media segment from the media stream maintained in cache at the server, and saving the media segment in a self-contained file, wherein the media segment file is shared by a user of the device over a network, and wherein pre-roll advertising is selected for the media segment file.

14. The method of claim 13, wherein pre-roll advertising is selected using metadata corresponding to the media segment.

15. The method of claim 14, wherein metadata comprises closed caption information.

16. The method of claim 13, wherein post-roll advertising is selected for the media segment file.

17. The method of claim 16, wherein post-roll advertising is selected using metadata corresponding to the media segment.

18. A non-transitory computer readable medium, comprising:
- computer code for receiving a request for a media stream from a device, the request received at a server;
- computer code for transmitting the media stream to the device;
- computer code for receiving a media segment indicator and a plurality of event triggers from the device, the media segment indicator and the plurality of event triggers identifying a media segment included in the media stream, wherein the media segment is shorter than the media stream in length; and
- computer code for generating a media segment file at the server by delineating the media segment from a portion of the media stream and subsequently obtaining he media segment from the media stream maintained in cache at the server, and saving the media segment in a self-contained file, wherein the media segment file is shared by a user of the over a network, and wherein pre-roll advertising is selected for the media segment file.

* * * * *